United States Patent [19]

Holland

[11] Patent Number: 5,403,491

[45] Date of Patent: Apr. 4, 1995

[54] MONITOR WELL HYDROCARBON ABSORBER AND SOLIDIFIER

[76] Inventor: Herbert W. Holland, 2314 Chimney Rock, Houston, Tex. 77057

[21] Appl. No.: 94,492

[22] Filed: Jul. 19, 1993

[51] Int. Cl.⁶ ................................. C02F 1/28
[52] U.S. Cl. .................................. 210/680; 210/693; 210/747
[58] Field of Search ............... 210/671, 680, 693, 747, 210/242.4, 282, 484, 924

[56] References Cited

U.S. PATENT DOCUMENTS

| | | | |
|---|---|---|---|
| 3,702,657 | 11/1972 | Cunningham et al. | 210/242.4 |
| 4,497,712 | 2/1985 | Cowling | 210/282 |
| 4,792,399 | 12/1988 | Haney et al. | 210/924 |
| 5,045,579 | 9/1991 | Sugerman | 524/128 |

*Primary Examiner*—Ivars Cintins

[57] ABSTRACT

A non-woven fabric cylinder adapted for insertion within a canister of screened casing pipe that is placed in underground monitor wells to collect and contain spilled or leaked hydrocarbons such as gasoline or diesel by absorbing same upon contact. The absorbed substance is solidified within the cylinder as a rubber-like mass. The consolidated mass is contained within the screened canister, will float indefinitely and is easily retrieved and handled for disposal. The cylinder will not leech solidified hydrocarbons when exposed to pressure limits used to determine landfill suitability.

1 Claim, 2 Drawing Sheets

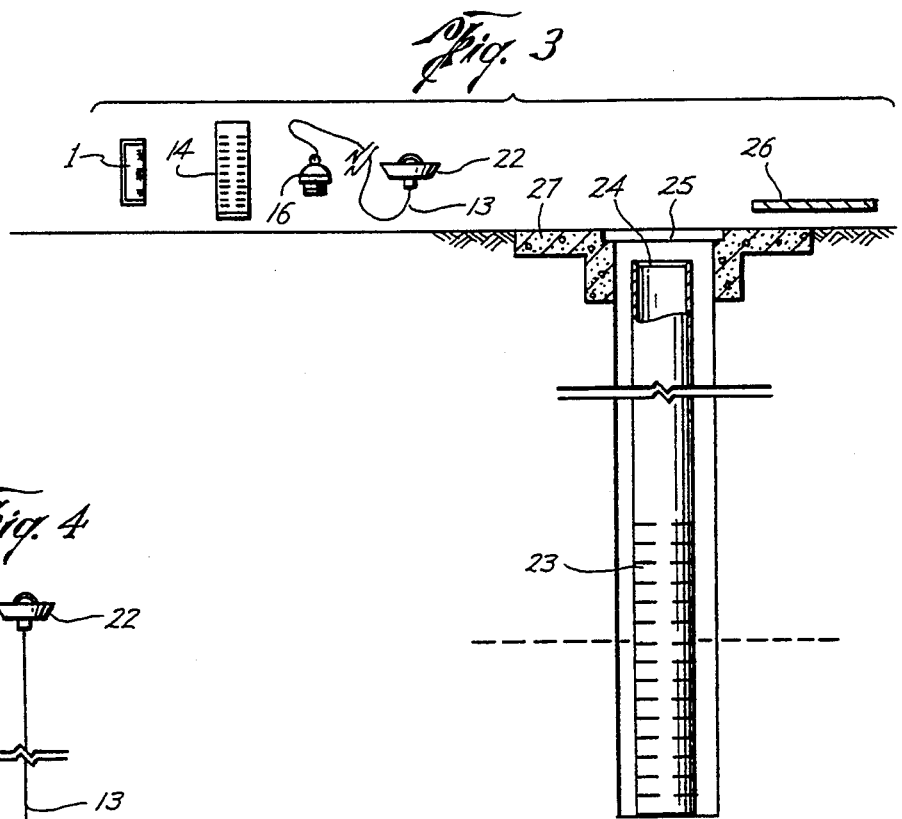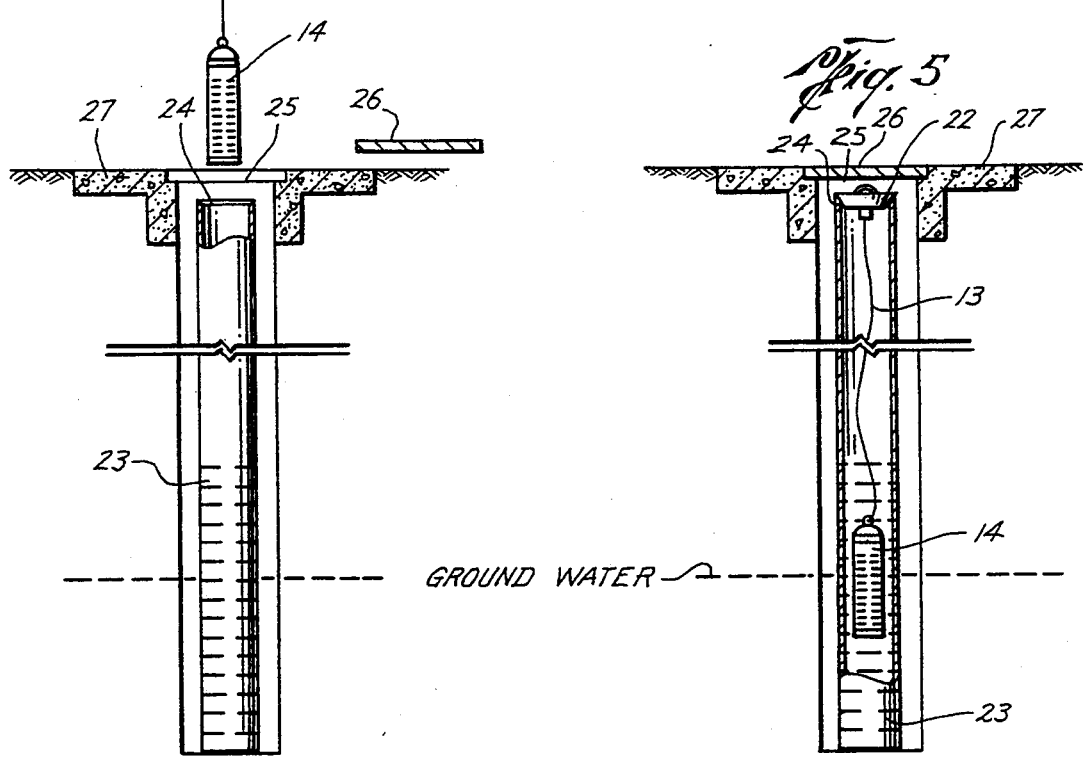

MONITOR WELL HYDROCARBON ABSORBER AND SOLIDIFIER

BACKGROUND OF THE INVENTION

The present invention relates to absorbent devices used for containing and removing leaked and spilled hydrocarbons in the monitor wells located in the storage tank vaults of automobile service stations and other fueling facilities.

For storage areas of fuels and fuel oils located at service stations and other fueling facilities, there is a need to monitor and remove hydrocarbons spilled or leaked into vaults and storage areas of the storage tanks as part of the routine maintenance of these facilities. This critically important task is necessary to prevent the hydrocarbons that accumulate in these enclosed storage areas from polluting the adjacent substrata by inadvertently allowing them to flow out of the containment area due to excessive rainfall runoff or other causes of an elevated water table.

One common method of extracting the pollutants from these monitor wells is to use a bailing device that is lowered into the well for collecting samples from the surface of the water contained in the well. The pollutant extracted from the well and any water also contained by the bailing device is placed in a container. The well is continually sampled until no pollutant is visible or detected in the bailing device when it is extracted from the well. The container of pollutant and water is then transported to a designated site for disposal.

Such prior art remediation device is extremely labor intensive. Further, hydrocarbon pollutants and contaminated water extracted from a well create a hazardous liquid cargo while being transported to an approved disposal site inasmuch as they are subject to leaking and spilling while in transit because the shipment is bulky and difficult to handle. Disposal of the contaminated liquid requires extracting the pollutants from the water until the water is of suitable cleanliness for free release back into the environment. Often, disposal merely results in the transfer of a pollutant from one environment to another.

SUMMARY OF THE INVENTION

In accordance with the present invention, an absorbent device is provided which will not only absorb hydrocarbons, but will also quickly and irreversibly solidify the absorbed hydrocarbon into an easily retrievable solid rubber-like mass. The device is formed as a vertically oriented sausage type cylinder from a sheet of polypropylene fabric sewn to form a cylinder with one end sewn closed. A layer of polymer is placed in the cylinder and is then covered with a polypropylene disk of a diameter corresponding to the inside diameter of the polypropylene cylinder. Another layer of polymer is placed on top of the disk, where it is covered by a second disk of similar size and composition. This structure is repeated until the entire volume of the cylinder has been filled with alternating layers of polymer and polypropylene disks. The cylinder is sewn using an overlock seam, sealing the alternating layers of polymer and polypropylene disks in the cylinder and producing a strong, neat seam on each end of the cylinder. The polypropylene fabric absorbs hydrocarbons on contact. This action, coupled with the unique stratification design of the chambered cylinder speeds migration of hydrocarbons through the alternating multi-layers of fabric and polymer.

The polypropylene cylinder is placed inside a cylinder of screened PVC tubing that is closed on both ends. The PVC canister is placed in a monitor well where it floats on the surface of the water in the well in a vertical orientation. The canister has a tether attached to it so as to be supported from the top of the monitor well. Spilled or leaked hydrocarbons that accumulate on the water's surface within the well are absorbed and solidified when the pollutant seeps through the screened wall of the PVC canister and comes in contact with the polypropylene cylinder inside it. The polypropylene shell absorbs the hydrocarbon, bringing it into contact with the alternating layers of polymer and polypropylene where it is further absorbed and then solidified. The screened PVC canister is removed from the well using the tether. The cylinder of solidified hydrocarbons is removed from the canister and is replaced with an identical new one. The remaining solidified cylinder is then transported to a site for disposal.

BRIEF DESCRIPTION OF THE DRAWINGS

The accompanying drawings illustrate the preferred embodiment invention in which:

FIG. 3 shows a cross section of a monitor well with the solidifying cylinder, screened canister, canister cap and well cap joined by the tether, sitting next to the monitor well openings;

FIG. 4 shows the assembled screened canister, suspended by the tether from the well cap, being introduced into the well through the manhole and well openings; and FIG. 5 shows the screened canister containing the polypropylene cylinder suspended from the well cap by the tether inside the screened well casing in the ground, floating on top of the ground water.

DESCRIPTION OF THE PREFERRED EMBODIMENT

Figure 1:
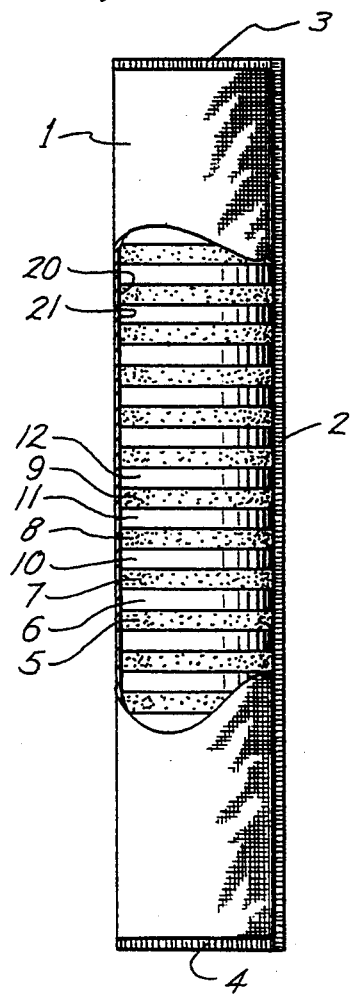
FIG. 1 is a cut away view of the polypropylene cylinder showing the alternating stratified layers of polymer and polypropylene disks within.
Figure 1A:
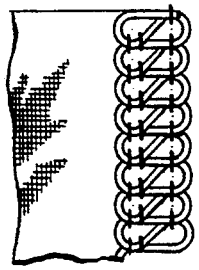
FIG. 1A shows the detail of the overlock seam used to sew the polypropylene sheet into a tube and to seal the polymer and polypropylene disks in the cylinder by closing each end.

In FIG. 1, an absorbent device in accordance with the present invention is shown revealing a stratification design inside a cylinder of polypropylene fabric 1. A seam along the side is used to make a tube for the cylinder from a sheet of polypropylene fabric 2. There is seaming on each end 3 and 4. This seam is shown in greater detail in FIG. 1A.

The cross section of the cylinder 1 reveals the stratification design inside the cylinder which is formed by placing an amount of polymer 5 in the end of the cylinder 3 prior to it being seamed shut. A flat circular piece of polypropylene fabric shaped as a disk 6 to conform to the internal dimensions of the cylinder is placed on top of the polymer in a horizontal orientation. This structure is repeated, alternating polymer 7, 8 and 9 and polypropylene disks 10, 11, and 12, until the cylinder is filled with the stratified configuration of polymer and polypropylene disks. The open end of the cylinder is then sewn shut using an overlock seam 3.

Figure 2:
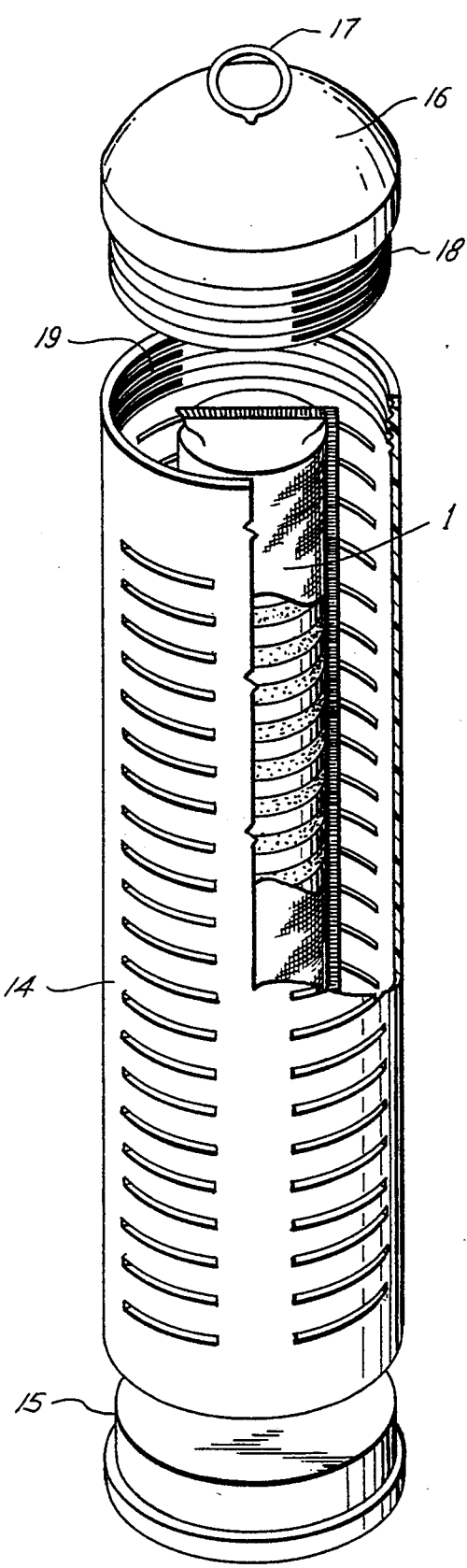
FIG. 2 is a cut away view of the screened PVC canister device showing the cut away polypropylene cylinder inside it.

As shown in FIG. 2, the cylinder 1 is placed inside the screened PVC canister 14 to allow the polypropylene and polymer cylinder to be contacted with the pollutants floating on top of the water in a monitor well. The canister's bottom 15 is shown prior to it being permanently bonded to the screened PVC canister. The top 16 of the canister 14 is shown with the eye attachment for the tether 17 and the male threads 18 used to attach it to the screened body of the canister via its matching female threads 19.

The layers of polymer and polypropylene disks are in contact with the wall of the cylinder in the full circumference of their layers 20 and 21. This allows hydrocarbons that come in contact with the outer layer of cylinder 1 to migrate via these contact areas 20 and 21 under capillary attraction to the interior layers of polypropylene disks 10, 11 and 12, and polymer 7, 8, and 9 and propagate throughout the cylinder.

Referring to FIG. 3, the cylinder 1 and the screened PVC canister 14 are shown sitting beside the well cap 22 that is joined to the top of the screened PVC canister 16 by a tether 13. The monitor well opening 24 in the screened well casing in the ground 23 is shown below the manhole opening 25. The manhole cover 26 is shown beside the manhole opening 25 and concrete apron 27 that surrounds the well openings.

As shown in FIG. 4, the screened PVC canister 14 containing the cylinder of stratified polymer and polypropylene is suspended by the tether 13 from the well cap 22 as it is being lowered through the manhole opening 25 and monitor well opening 24 and into the screened well casing in the ground 23.

Referring to FIG. 5, a cut away section of the screened well casing in the ground 23 reveals the screened PVC canister 14 containing the cylinder of stratified polymer and polypropylene floating on the surface of the ground water in the monitor well. The screened PVC canister 14 is secured to the well cap 22, set in place in the monitor well opening 24, by a tether 13. The manhole cover 26 is set in place, covering the manhole opening 25 and is flush at grade with the concrete apron around the monitor well 27.

In accordance with the preferred embodiment directed to monitor wells and the like, the cylinder 1 measures 12"×2". Each cylinder chamber contains approximately 0.1 ounce by weight of the absorbent and solidifying polymer material for an approximate total weight of six ounces of polymer in the cylinder. The polymer material is preferably polynorbornene available under the trademark Norsorex APX1, or an equivalent.

Ambient temperature and the viscosity of the hydrocarbon to be solidified are the two most critical factors in determining the rate of absorption and the amount of time required to solidify the broad spectrum of hydrocarbons this invention is designed to contain for removal and disposal. To enhance the polymer's effective interaction with pollutants, the cylinder's construction utilizes the layering of polymer material and fabric to control the rate of absorption and solidification.

The stratification design allows for optimum efficiency in utilizing the solidifying properties of the polymer. Very light viscosity hydrocarbons react almost instantaneously with the polymer and are exposed to no more polymer than can be fully utilized for absorption and solidification. Stratification promotes rapid migration of light viscosity hydrocarbons throughout the interior of the cylinder while slowing migration of the hydrocarbon through the outer surface envelope area and exposure to the polymer. The extremely rapid reaction between the light viscosity hydrocarbon and the polymer could otherwise result in the loose polymer located within the volume of the cylinder being surrounded by a non-permeable rubber shell thereby preventing the encapsulated polymer from being used to solidify additional hydrocarbons.

In addition, the stratification design allows the heavier viscosity hydrocarbons that migrate through the layers of polypropylene fabric to be suspended inside the cylinder awaiting the polymer to absorb them and begin the solidification process.

The properties of the polypropylene fabric that allow for rapid absorption and migration of all viscosities of hydrocarbons effectively gives the device maximum surface area exposure of the polymer through the stratification design.

Additional applications include, but are not limited to, removal of hydrocarbons from petrochemical plants and pipelines, marine and aviation fueling facilities, and rail and trucking fueling terminals as well as use as a containment and clean-up product for municipal entities charged with eliminating petrochemical spills.

The description of the preferred embodiment has been for the purpose of explanation and illustration. It will be appreciated by those skilled in the art that many modifications and changes can be made in the structure without departing from the essence of the present invention. Certain applications of the invention may require the use of additional stratified layers of the polypropylene and polymer. In addition, other synthetic material such as spun-bonded, needlepunched or needle loomed materials with physical properties similar to those of the polypropylene material may be used in an effort to increase the efficiency and usefulness of the invention. Therefore, it is contemplated that the appended claims will cover any modifications or embodiments which fall within the scope of the invention.

What is claimed is:

1. A method of collecting and removing hydrocarbons from an underground monitor well located proximate a fueling facility storage tank, comprising the steps of:

providing an absorbent device having an exterior envelope of polypropylene fabric containing therein a polymer material that acts to absorb and solidify liquid hydrocarbon substances that come into contact with the envelope;

placing the absorbent device within a screened canister adapted to be placed within the bore of the monitor well;

tethering the screened canister for controlled lowering and raising within the monitor well;

lowering the canister into the monitor well to the surface level of any liquid collected in the well;

allowing hydrocarbons on the surface of the collected liquid to be absorbed and solidified as they pass through the screened canister and into contact with the absorbent device;

removing the canister from the monitor well;

replacing the absorbent device containing the solidified hydrocarbons from the canister; and disposing of the replaced absorbent device.

* * * * *